United States Patent [19]

Tilson et al.

[11] 4,107,327

[45] Aug. 15, 1978

[54] TRANSFER MATERIALS

[75] Inventors: Edward Arthur Tilson; Raymond Leonard Mayhew, both of Waltham, England

[73] Assignee: Caribonum Limited, London, England

[21] Appl. No.: 811,832

[22] Filed: Jun. 30, 1977

Related U.S. Application Data

[63] Continuation of Ser. No. 667,523, Mar. 16, 1976, abandoned.

[30] Foreign Application Priority Data

Mar. 26, 1975 [GB] United Kingdom ............... 12609/75

[51] Int. Cl.² ................................................ B32B 5/18

[52] U.S. Cl. .................................. 428/304; 282/27.5; 428/425

[58] Field of Search ............... 428/304, 305, 306, 307, 428/914, 425; 282/27.5

[56] References Cited

U.S. PATENT DOCUMENTS

| | | | |
|---|---|---|---|
| 3,595,683 | 7/1971 | Newman | 428/306 |
| 3,681,186 | 8/1972 | Findlay et al. | 428/305 |
| 3,689,301 | 9/1972 | Scott | 428/307 |
| 3,776,864 | 12/1973 | Woerner | 428/514 |

FOREIGN PATENT DOCUMENTS

| | | |
|---|---|---|
| 1,217,844 | 12/1970 | United Kingdom. |
| 1,348,417 | 3/1974 | United Kingdom. |

*Primary Examiner*—William J. Van Balen
*Attorney, Agent, or Firm*—Watson, Cole, Grindle & Watson

[57] ABSTRACT

This application is concerned with solvent coated carbon papers which consist of a base sheet, a layer of porous material with colored ink contained within the pores in which the porous material comprises a mixture of a cellulose ester and an acrylic resin.

4 Claims, No Drawings

TRANSFER MATERIALS

This is a continuation of application Ser. No. 667,523 filed Mar. 16, 1976, now abandoned.

This invention has reference to Transfer Materials of the kind usually referred to as Carbon Paper and more particularly of the kind referred to as Solvent Coated Carbon Papers. Such Solvent Coated Carbon Papers consist of a base sheet to which is firmly bonded a layer of porous material and the pores of such material contain coloured ink, which coloured ink is squeezed out of the porous layer when pressure is exerted on it as by a writing implement or a typewriter print face. Such Solvent Coated Carbon Papers are described for example in British patent specifications Nos: 382,220, 780,492 and 840,673. In British patent specification No.: 392,220 there is described a Porous coating having as a major constituent one or more cellulose esters and in British patent specifications Nos. 780,492 and 840,673 there are described porous coatings having as a constituent a vinyl polymer. Other constituents for the porous coatings have also been proposed including acrylic resins (particularly polymethyl methacrylate resins).

It is well-known that solvent carbon systems, based on polymethyl methacrylate resins, are capable of producing transfer layers which yield copies of good intensity and yet which are resistant to producing marks when subjected to non-imaging pressures, e.g. by passage through the rollers on a typewriter, even after the surface of the layer has been broken through use.

Such transfer layers have two major defects however:

i. the ink release characteristics are such that only a limited number or copies can be obtained before the copy intensity becomes unacceptably low or uneven, ii. the ink containing resin layers have poor adhesion properties, particularly to bases of film material such as polyester or polypropylene, It is also well known that solvent carbon systems based on Cellulose Acetate Butyrate resins can yield layers which are particularly clean to handle, yet which give copies of good intensity whilst still retaining good use-life characteristics.

These layers also have drawbacks namely:

i. although resistance to "roller-marking" can be high when used only a limited number of times, this resistance is lost after extended use, ii. odour is a difficult problem to overcome, this being largely (although not entirely) a function of the free butyric acid contained in the C-A-B resin, iii. the solvent carbon inks or "dopes" have unstable viscosity characteristics, showing a marked tendency to increase with age, necessitating high percentage additions of expensive solvents such as Methyl Ethyl Ketone to reduce to a coatable viscosity.

It is an object of the present invention to provide an improved transfer material of the solvent coated carbon kind.

It is another object of the present invention to provide a solvent coated carbon paper capable of use in different applications.

The applicants have now found that improved solvent coated carbon papers can be provided utilising a mixture of one or more cellulose esters and one or more acrylic resins. In particular it has now been found that the use of mixture of Cellulose Acetate Butyrate resin with acrylic resin can reduce the problem of the single resin component systems to a very considerable degree. The particular ratio chosen is governed by the end-use application, but in general, ratios by weight of C-A-B resin to acrylic resin varying from 6;1 to 1:6 are suitable, although the preferred range is from 3:1 to 1:3. For handwriting or roller imprint applications, a higher proportion of C-A-B resin is preferred, whereas for typewriter or other impact strokes a higher acrylic resin proportion is desirable.

It is found that having a ratio of 1 part C-A-B resin to 1 part acrylic resin by weight gives a coating useful for both handwriting and typing applications.

As a general guide but having certain limitations it is found that increasing the acrylic content gives an increase in sharpness of transfer quality but gives a decrease in use life.

Transfer material in accordance with the present invention may be made according to the following examples.

EXAMPLE 1

A porous coating layer with colouring matter is formed from the following constituents:

| Part 1 (colouring material | | |
|---|---|---|
| Substantially non drying | % | parts by weight |
| Vegetable Oils (for example rapeseed, groundnut, castor oil or mixture of same) | 10.5 | |
| Vegetable Lecithin | 1.0 | " |
| Raven 1255 Carbon Black | 6.4 | " |
| Reflex Blue Toning Pigment | 1.0 | " |
| Di iso Butyl Phthalate | 1.0 | " |
| Toluene | 6.4 | " |

| Part 2 (porous coating) | | |
|---|---|---|
| Cellulose Acetate Butyrate resin (½ sec) | 6.5 | " |
| Elvacite 2009 (Medium Molecular Weight Poly Methyl Methacrylate Resin (ex Du Pont) | 6.5 | " |
| Methyl Ethyl Ketone | 51.1. | " |
| Ethyl Acetate | 9.6 | " |

Part 1 above referred to is prepared by grinding the constituent parts in a pebble mill for 16 hours. The mill is unloaded.

Part 2 above referred to is prepared by adding the Elvacite resin to the solvent whilst stirring and the mixture is stirred until the resin is dissolved. The cellulose acetate butyrate is likewise dissolved in the solvent and this solution is then added to the Elvacite resin solution with stirring.

Part 1 is then added to Part 2 and stirred until mixed. The mixture is then applied by any suitable web coating technique (for example the reverse rolling and scraper techniques to paper or film such as Polypropylene or Polyester), preferably bearing a key coating based on polyurethane resin as is herein after described. The coating so produced was found to be suitable for both typewriter and pencil applications.

EXAMPLE 2

A porous coating layer with colouring matter is formed from the following constituents:

| Part 1 | % | parts by weight |
|---|---|---|
| Substantially non-drying Vegetable Oils (for example rapeseed, groundnut, castor oil or mixture of same) | 11.1 | |
| Catafor 020 - ABM Chemicals - (Ethoxylated amine oleate) | 0.5 | " |
| Raven 1255 Carbon Black | 6.7 | " |
| Regal SRF (Carbon Black) | 1.3 | " |
| Victoria Blue Toner | 0.3 | " |
| Di iso Butyl Phthalate | 1.0 | " |
| Toluene | 10.9 | " |

| Part 2 | % | parts by weight |
|---|---|---|
| Toluene | | |
| Cellulose Acetate Butyrate resin | 10.9 | |
| (½ sec) | 1.9 | " |
| Elvacite 2009 (Medium Molecular Weight Poly Methyl Methacrylate) ex Du Pont | 11.5 | " |
| Methyl Ethyl Ketone Solvent | 29.2 | " |
| Ethyl Acetate Solvent | 14.6 | " |

Part 1 above referred to is prepared by grinding the constituent parts in a pebble mill for 16 hours. The mill is unloaded into a container.

Part 2 above referred to is prepared by adding the Elvacite Resin to the solvent whilst stirring and the mixture is stirred until the resin is dissolved. The cellulose acetate butyrate is likewise dissolved in the solvent and this solution is then added to the Elvacite resin solution with stirring.

The mixture is then applied by reverse roller and scraper techniques to paper or film, polypropylene or polyester film preferably with a precoat (preferably polyurethane), as will be herein after described.

The coating so produced was found to be suitable for typewriter application.

Alternative compounds to the cellulose acetate butyrate and methyl methacrylate may be used. Instead of cellulose acetate butyrate, cellulose acetate propionate or other cellulose esters may be employed. Furthermore high molecular weight ethyl methacrylate; high molecular weight n-butyl methacrylate or low molecular weight methyl/n butyl methacrylate copolymer may be employed, as the acrylic resin. Also mixtures of cellulose esters and/or mixtures of acrylic resins may be used.

Furthermore other pigments or other colours may be included replacing part or all of the pigments referred to in the above examples. Similarly suitable colour formers may be used instead of the pigments to be used in conjunction with colour developing components (for example acidic or electron accepting compounds) which on being contacted by the developing components a colour is developed.

It may be preferred to apply a precoat layer to the base film. In such a case a precoat of the following formula may be applied:

| Precoat Formulae | % | parts by weight |
|---|---|---|
| Daltosec 1350 (ICI) Moisture curing isocyanate resin (Polyurethane) | 24.0 | |
| Gasil 937 (Filler) Joseph Crosfield) | 1.3 | " |
| Dispercel Chips 33/2019 (Columbia) (Pigmented Nitrocellulose chips) | 6.0 | " |
| Ethyl Acetate ("P" grade) (Solvent) | 68.7 | " |

The precoat layer is then applied to the base material (paper or film) by gravure printing techniques.

If desired the Dispercel Chips may be replaced by PGHX 30–50 20% DBP (ICI) Nitrocellulose chips in equal amounts.

What we claim is:

1. Transfer material comprising a base sheet including a precoat layer, a layer of porous material bonded to the precoat layer and colored ink contained within the pores of the porous material wherein the porous material comprises a mixture of cellulose acetate butyrate and medium molecular weight methyl methacrylate resins in a ratio of 6:1 to 1:1.

2. Transfer material according to claim 1 wherein the precoat is composed of polyurethane.

3. Transfer material according to claim 1 wherein the coloured ink includes a colour former.

4. Transfer material according to claim 1 wherein the base sheet includes a sheet of polypropylene or polyester film.

* * * * *